United States Patent Office 3,761,261
Patented Sept. 25, 1973

3,761,261
PHTHALOCYANINE DYE SENSITIZERS FOR ZINC OXIDE
Hisatake Ono, Asaka, Satoru Honjo, Tokyo, and Masaaki Takimota, Asaka, Japan, assignors to Xerox Corporation, Stamford, Conn.
No Drawing. Filed Nov. 2, 1971, Ser. No. 195,005
Claims priority, application Japan, Nov. 11, 1970, 45/99,335
Int. Cl. G03g 5/08
U.S. Cl. 96—1.7         8 Claims

ABSTRACT OF THE DISCLOSURE

An electrophotographic sensitizing phthalocyanine dye derivative is disclosed for extending spectral response of a zinc oxide photosensitive layer into the red wavelength region, while at the same time exhibiting good chemical stability during the binder setting and handling steps used for production of the photosensitive layer.

BACKGROUND OF THE INVENTION

This invention relates to a dye sensitized electrophotographic photosensitive material. In particular, it relates to a sensitizing dye adapted for use with a zinc oxide photosensitive material.

The prior art has recognized that spectral sensitization of a zinc oxide photosensitive material can be carried out by adsorption of various dyes on the surface of the zinc oxide. It has further been determined that adsorption of the sensitizing dyes may be carried out by various procedures including forming a methanolic solution of the dye and adding the zinc oxide thereto. Other procedures include adding a dye solution to a suspension of a zinc oxide-resin dispersion system, or first coating the zinc oxide-resin dispersion on a support material followed by application of the dye solution directly on the zinc oxide coating.

Various dyes have been used to achieve spectral sensitization of a zinc oxide photosensitive material among which are included xanthene dyes, triphenylmethane dyes, anthraquinone dyes, azo dyes, cyanine dyes and merocyanine dyes. These dyes are normally used with a zinc oxide photosensitive material which has been dispersed in a suitable binding agent before coating on a support material. Among the binding agents used for dispersing the photosensitive material are silicon resins, alkyl resins, polyvinyl chloride, polyvinyl acetate, vinyl chloride -vinyl acetate copolymer, polystyrene, polyalkylmethacrylate, polyalkylacrylate, styrene-butadiene copolymer, epoxy resins and epoxy esters.

Therefore, in the production of a dye sensitized zinc oxide photosensitive material, a suitable dye and binder material must be selected. The present inventors have determined that in preparing a dye sensitized zinc oxide photosensitive material, it is generally difficult or even impossible to make an independent determination of the dye to be used for spectral sensitization, without considering what binder materials must be used. It therefore becomes impossible to make an independent selection of both a spectral sensitizing dye and a binder material. This inability to make an independent selection of both materials arises because of minor impurities which are conventionally found in various resins and which produce undesirable effects on the specific sensitizing dye. Also, depending on the binder material used, thermal treatment or hardening by catalyst addition are required to set the binder and these procedures frequently produce undesirable effects on the sensitizing dye. Thus, unless a careful selection of binder and dye are made, sufficient sensitivity will not be achieved by the dye addition. Furthermore, decomposition products of the dye which are sometimes produced during storage of the electrophotographic photosensitive layer may deteriorate the dark decay characteristics of the photosensitive layer, depending on the specific dye employed.

A further problem with dye sensitized zinc oxide photosensitive materials is the effect of the zinc oxide on the sensitizing dye in the event of inadvertent exposure of the mixture to light during storage or manufacture. Since the sensitizing dye adsorbed on the surface of the zinc oxide is presumed to receive chemical stimulation from the zinc oxide, inadvertent exposure of the photosensitive layer to light during the manufacture or storage thereof will result in an accelerated fading of the dye with a reduction in spectral sensitization. Therefore, inadvertent exposure of light must be carefully controlled for most combinations of zinc oxide-binder and sensitizing dye systems.

The principal object of the present invention is the provision of a dye sensitized zinc oxide photosensitive layer for use in electrophotography.

An object of the present invention is also the provision of a dye material adapted for use as the spectrally sensitizing dye in the electrophotographic photosensitive layer.

Another object of the present invention is the provision of a spectrally sensitizing dye material, suitable for use in a zinc oxide electrophotographic photosensitive layer without a restriction as to the binder resin employed therewith.

A further object of the present invention is the provision of a spectrally sensitizing dye material, suitable for use in a zinc oxide electrophotographic photosensitive layer, which is capable of withstanding the hardening procedures required to set the resinous binder.

SUMMARY OF THE INVENTION

These and other objects are accomplished by an electrophotographic, photosensitive layer consisting of insulative resin with a zinc oxide photosensitive material dispersed therein, and with a dye added to achieve spectral sensitization, which meets the above stated objects of this invention, and which comprises a phthalocyanine dye derivative containing 2 to 4 hydrophilic or oleophilic substituent radicals in a molecule thereof and represented by the following general formula:

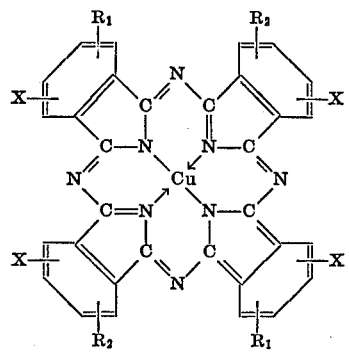

wherein X represents a hydrogen atom or a radical selected from the group consisting of $SO_3H$, $SO_3M$, COOH, and COOM with M representing either a potassium or sodium atom. $R_1$ represents either a hydrogen atom, a phenyl radical or $SO_3^-(N^+H_3\text{—}R_3)$; while $R_2$ represents a hydrogen atom, phenyl radical, a $SO_2NH\text{—}R_3$; with $R_3$ representing a normal or branched hydrocarbon radical containing 1 to 12 carbon atoms. The zinc oxide photosensitive layer further incorporates the sensitizing dye in an amount of .0001% to 1% by weight of the zinc oxide used in the photosensitive layer.

The sensitizing dye set forth in the present invention obviates many of the difficulties in using sensitizing dyes which have been previously used with zinc oxide photosensitive layers, including restrictions as to the type of binder material used and methods for hardening it. These difficulties are overcome by the present dye, which is remarkably stable in the presence of binder materials used with the photosensitive layer, and during the coating and setting processes used in producing the photosensitive layer. The dye of the present invention further adsorbs well on the zinc oxide photosensitive layer with resultant spectral sensitization thereof without substantial deterioration under normal manufacturing and storage conditions.

DESCRIPTION OF THE PREFERRED EMBODIMENTS

The sensitizing dye according to this invention is a phthalocyanine dye having 2 to 4 hydrophilic or oleophilic substituent radicals, and which shows excellent adsorption on the zinc oxide layer as well as spectral sensitization above 650 mu, or in the red wavelength region. Spectral sensitization at a wavelength longer than 650 mu or in the red wavelength region is principally required to produce a photosensitive layer which has the panchromaticity for multicolor reproduction. For multicolor reproduction, sensitization above this wavelength is desirable to decrease the overlapping of spectral transmission regions between multicolored filters which are employed for red, blue and green color discernment from a multicolored original. Spectral sensitization at a wavelength region above 650 mu also has the additional advantage of increasing photosensitivity of the photosensitive layer. This is advantageous since the tungsten lamp normally used for exposure has a temperature which is high enough to impart considerable energy in this longer wavelength region. Although prior to this, various dyes of the triphenylmethane series are known to show spectral adsorption around 650 mu, nevertheless, to achieve dye sensitization in the wavelength region above 650 mu, it was necessary to employ various xanthene cyanine or merocyanine dyes which are not only expensive, but are also quite susceptible to impurities such as peroxides, which are found in the binder resins or various oxidative catalysts which would be normally used to set or harden the binder resin. They further did not exhibit good light fastness under conventional manufacturing and storage techniques.

The sensitizing dye in the present invention is free from these drawbacks of the prior art and shows excellent spectral sensitization in the wavelength region of 670–680 mu when added to an electrophotographic photosensitive layer. The sensitizing dye may be made selectively soluble in various aqueous or non-aqueous type solvent systems including water, alcohol, and hydrocarbon type solvents, by introducing either hydrophilic or oleophilic substituent groupings on the phthalocyanine molecule. The substituent radicals envisioned further contribute to adsorption of the dye to the zinc oxide, thus improving efficiency of spectral sensitization.

The electrically insulating resin or binder may be selected from a large group of substances, included among which are silicon resins, alkyl resins, polyvinyl chloride, polyvinyl acetate, vinyl chloride, vinyl acetate copolymer, polystyrene, polyalkylmethacrylate, polyalkylacrylate, styrene-butadiene copolymer and epoxy resins and esters. Mixtures of two or more of these resin binders may be employed and plasticizers or similar modifying agents may be incorporated therein provided that they do not adversely affect the electrical properties of the materials.

The zinc oxide photoconductive material employed in the present invention is readily available commercially and can be purchased under a variety of trade names. The most useful or optimum quantity of zinc oxide to binder for the particular binder used can be readily determined by making a series of test coatings wherein the quantity and relative amounts of zinc oxide to binder are employed, since optimum proportions are dependent upon the binder, sensitizing dyes, and results desired. The zinc oxide and resin binder may be combined by dissolution of the binder material in an aqueous or non-aqueous solvent system capable of effecting solution thereof, and then dispersing the zinc oxide therein.

The organic dye which has been disclosed herein for extending spectral response of the zinc oxide may be adsorbed on the zinc oxide particles by utilizing the dye in an amount of .0001% to 1% by weight of the zinc oxide, and adsorption may be carried out by storing the zinc oxide particles with the dye prior to mixing with the binder, by adding the dye to the zinc oxide coating dispersion before coating the mixture upon a support, or by staining the completed coating with the dye.

The completed zinc oxide-binder and dye coating may be placed on a support or recording member which may be either a relatively insulating material such as paper, or it may be a relatively conducting material, such as metal foil or sheet, or paper loaded with carbon or graphite particles. Following this the coated sensitized recording member is suitable for use in an electrophotographic process.

The general nature of the invention having been set forth, the following examples are now presented as illustrations but not limitations of the method and means of carrying out the invention.

EXAMPLE 1

100 parts by weight of zinc oxide, 20 parts by weight of styrenated alkyd resin (Japan Reichrold, Styresol No. 4400), 0.2 part by weight of cobalt naphthenate as hardening catalyst and 80 parts by weight of toluene were placed in a porcelain ball mill and blended for 16 hours to obtain a white suspension. To this suspension was added the three sensitizing dye solutions listed below as Samples A, B and C. The weights listed for ingredients of these dye solutions refer to weights per 100 grams of zinc oxide.

The mixtures of the dyes and zinc oxide suspension were each mixed well and then respectively coated on an aluminum foil to produce three different photosensitive layers with a thickness of about 10 microns after drying, which were designated Samples A, B and C, respectively, and which corresponded to those dye solutions used to prepare each layer. After drying each layer, they were placed in a thermostat box of 50° C. for 16 hours to harden the binder resin.

Sample A

| | |
|---|---|
| 3-B-carboxyethyl - 2(3,3 - dicyanoallylidene)-benzothiazole | mg 40 |
| Erythrosin | mg 20 |
| Brilliant blue FCF | mg 20 |
| Methanol | ml 10 |

Sample B

| | |
|---|---|
| Dye (I) | mg 30 |
| Methanol | ml 10 |

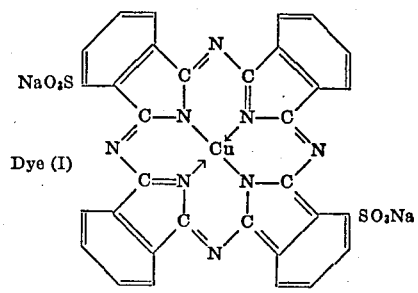

Dye (I)

C.I. Solvent Blue 86
(C.I. 74350(74180))

Sample C

| | | |
|---|---|---|
| Dye (II) | mg | 30 |
| Methanol | ml | 10 |

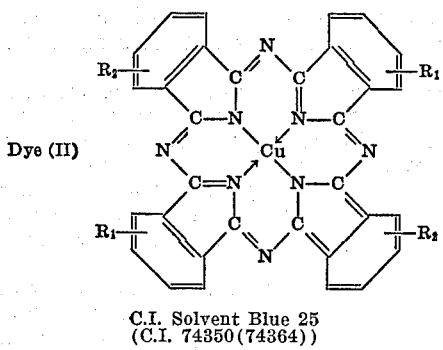

C.I. Solvent Blue 25
(C.I. 74350(74364))

$R_1$:$SO_2NHCH_2CH_2CH_2CH(CH_3)_2$
$R_2$:$SO_3^-[H_3N^+CH_2CH_2CH_2CH(CH_3)_2]$

Spectral reflectance of the three prepared electrophotographic photosensitive layers was then immediately measured after the drying and hardening treatment. There was considerable variation in the spectral reflectance of Sample A whereas there was almost no variation in that of Samples B and C, indicating the durability of the sensitizing dye set forth in the present invention during the resin hardening process.

Sample A containing three sensitizing dyes showed spectral absorption of 460, 540, and 640 mu, while the Samples B and C respectively showed spectral absorption at 680 and 670 mu. The results are summarized in Table 1.

TABLE 1

| | | Spectral reflectance | |
|---|---|---|---|
| Sample: | Spectral absorption (mμ) | Directly after coating (percent) | After hardening treatment (percent) |
| A | 460 | 42 | 50 |
| | 540 | 59 | 67 |
| | 640 | 55 | 58 |
| B | 680 | 76 | 76 |
| C | 670 | 89 | 89 |

Thus, in Sample A the added dyes are deemed to be almost decomposed while in Samples B and C the dyes are found to be almost intact. The values of spectral reflectance which are larger in Samples B and C than in Sample A will be attributable to the difference in molecular absorption coefficients and added amount of dye sensitizers.

EXAMPLE 2

100 parts by weight of zinc oxide, 12 parts by weight of styronated alkyd resin, 8 parts by weight of polyisocyanate compound as the hardening catalyst (Bayer: Desmodule L) and 80 parts by weight of n-butyl acetate were placed in a porcelain ball mill and blended for 16 hours to obtain a white suspension. To this suspension was added three dye solutions listed below as Samples E, F, and G. The weights listed for the ingredients of these dye solutions refer to weights per 100 grams of zinc oxide.

The mixtures of the dyes and zinc oxide suspensions were each mixed well and then respectively coated on an aluminum foil to produce four different photosensitive layers with a thickness of about 10 microns after drying. Each layer was respectively designated as Samples E, F and G, all of which corresponded to those dye solutions used to prepare each layer. After drying of each layer, the samples were placed in a thermostat box of 50° C. for 16 hours to harden the binder resins.

Sample E

| | | |
|---|---|---|
| C.I. Direct blue 86 (C.I. 74180) (Dye I) | mg | 30 |
| Methanol | ml | 10 |

Sample F

| | | |
|---|---|---|
| C.I. Solvent blue 25 (C.I. 74350 (74364) (Dye II) | mg | 30 |
| Methanol | ml | 10 |

Sample G

| | | |
|---|---|---|
| (Dye III) | mg | 30 |
| Methanol | ml | 10 |

Dye (III)

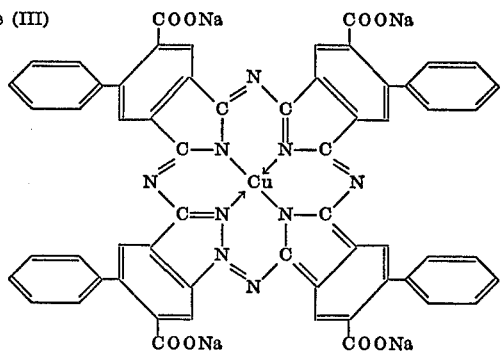

Spectral sensitivities on the three photosensitive layers indicated good sensitivity in the red spectral region or at 670–680 mu. They furthermore showed little variation thus indicating the durability of the sensitizing dyes set forth in the present invention in the resin hardening procedures.

What is claimed is:

1. An electrophotographic, photosensitive material of improved spectral response, comprising a photosensitive dispersion of zinc oxide in an insulating thermal- or catalytically-hardened resin binder material, said dispersion containing between about .0001% to 1% by weight of the zinc oxide of a dye having the formula:

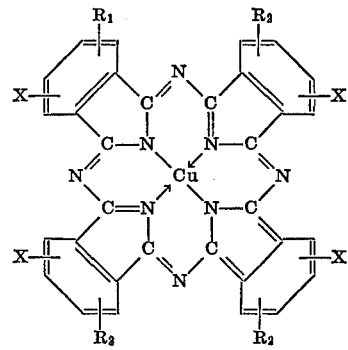

wherein X is individually defined as hydrogen, $SO_3H$, COOH or corresponding salts thereof; $R_1$ is defined as hydrogen, a phenyl group or $SO_3^-(N^+H_3—R_3)$ wherein $R_3$ is a normal or branched hydrocarbon having not more than 12 carbon atoms, and $R_2$ is hydrogen, a phenyl group or $SO_2NH—R_3$, the dye having 2–4 hydrophilic or oleophilic substituent radicals.

2. An electrophotographic, photosensitive material having improved spectral response about 650 mu comprising a photosensitive dispersion of zinc oxide in an insulating thermal- or catalytically hardened resin material, said dispersion containing between about .0001 and 1% by weight of the zinc oxide, of a dye having the formula:

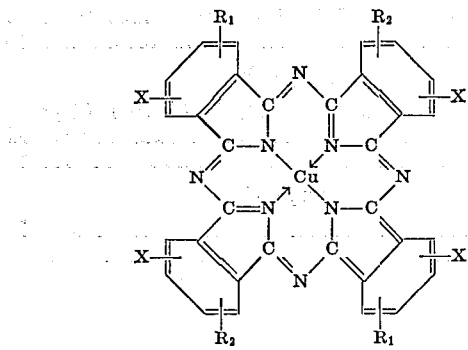

wherein X is a radical selected from the group consisting of hydrogen, $SO_3H$ and the sodium and potassium salts thereof, COOH and the sodium and potassium salts thereof; $R_1$ is defined as hydrogen, a phenyl group and $$SO_3^-(N^+H_3{-}R_3)$$

wherein $R_3$ is a normal or branched hydrocarbon having not more than 12 carbon atoms; $R_2$ is a radical selected from the group consisting of hydrogen, a phenyl group and $SO_2NH{-}R_3$, the dye having 2–4 hydrophilic or oleophilic substituent radicals.

3. A method of increasing the spectral response of a zinc oxide photosensitive material comprising:
 (a) forming a photosensitive dispersion of zinc oxide and an insulating thermal or catalytically hardened resin binder material,
 (b) adding to said dispersion between about .0001% and 1% by weight of the zinc oxide of a sensitizing dye, capable of imparting spectral response to said photosensitive layer about 650 mu, and having the formula:

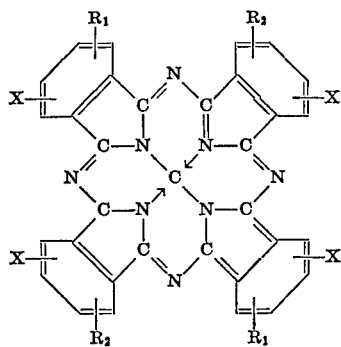

wherein X is a radical selected from the group consisting of hydrogen, $SO_3H$ and salts thereof, COOH and salts thereof, $R_1$ is a radical selected from the group consisting of hydrogen, a phenyl group, and $SO_3^-(NH^+{-}R_3)$; and $R_2$ is a radical selected from the group consisting of hydrogen, a phenyl group, and $SO_3NH{-}R_3$, wherein $R_3$ is a normal or branched hydrocarbon having not more than 12 carbon atoms.

4. An electrophotographic, photosensitive material of improved spectral response set forth in claim 1 wherein said $SO_3H$ salts and COOH salts are selected from the group consisting of sodium and potassium salts thereof.

5. An electrophotographic, photosensitive material of improved spectral response as set forth in claim 1 wherein $R_3$ is an aliphatic hydrocarbon radical having not more than 12 carbon atoms.

6. An electrophotographic, photosensitive material of improved spectral response as set forth in claim 2 wherein $R_3$ is selected from the group consisting of normal and branched aliphatic hydrocarbons having not more than 12 carbon atoms.

7. A method as set forth in claim 3 wherein said $SO_3H$ and COOH salts are selected from the group consisting of sodium and potassium salts thereof.

8. A method as set forth in claim 3 wherein $R_3$ is selected from the group consisting of normal and branched aliphatic hydrocarbons having not more than 12 carbon atoms.

References Cited

UNITED STATES PATENTS

| | | | |
|---|---|---|---|
| 3,486,888 | 12/1969 | Browning | 96—1.7 |
| 3,384,488 | 5/1968 | Tulagin et al. | 96—1.5 X |
| 3,498,784 | 3/1970 | Kramm et al. | 96—1.5 |

FOREIGN PATENTS

| | | | |
|---|---|---|---|
| 4,113,664 | 7/1966 | Japan | 96—1.7 |

OTHER REFERENCES

Meier: "Sensitization of Electrical Effects in Solids," Journal of Phys. Chem., vol. 69, No. 3, March 1965, pp. 719–729.

Putzeiko, Dokl. Akad. Nauk S.S.S.R., vol. 129, November-December 1959, pp. 303–306.

ROLAND E. MARTIN, JR., Primary Examiner

U.S. Cl. X.R.

260—314.5

UNITED STATES PATENT OFFICE
CERTIFICATE OF CORRECTION

Patent No. 3,761,261          Dated September 25, 1973

Inventor(s) Hisatake Ono et al

It is certified that error appears in the above-identified patent and that said Letters Patent are hereby corrected as shown below:

IN THE SPECIFICATION:

1. Column 4, line 75-- The word "Solvent" should be --Direct--.

2. Column 4, line 75-- The words "(C. I. 74350(74180)" should be --(C. I. 74180)--.

3. Column 6, line 25-- The #5 nitrogen atom " 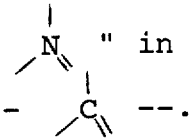 " in the lower left hand phenylpyrrole moiety should be -- 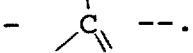 --.

IN THE CLAIMS:

4. Column 6, line 60-- The letter "$R_2$" in the lower right hand phenylpyrrole moiety should be --$R_1$--.

5. Column 7, line 45-- The central element " 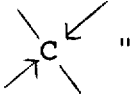 " should be -- 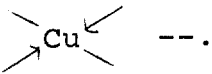 --.

Signed and sealed this 23rd day of April 1974.

(SEAL)
Attest:

EDWARD M.FLETCHER,JR.
Attesting Officer

C. MARSHALL DANN
Commissioner of Patents